Nov. 19, 1968 R. E. ANDERSON 3,412,384

MOUNTING FOR FLOATING MAGNETIC TRANSDUCER HEADS

Filed Aug. 27, 1965

INVENTOR.
ROBERT E. ANDERSON

BY

Frank R. Trifari

AGENT.

United States Patent Office 3,412,384
Patented Nov. 19, 1968

3,412,384
MOUNTING FOR FLOATING MAGNETIC TRANSDUCER HEADS

Robert E. Anderson, Saugerties, N.Y., assignor to Ferroxcube Corporation, a corporation of Delaware
Filed Aug. 27, 1965, Ser. No. 483,215
3 Claims. (Cl. 340—174.1)

ABSTRACT OF THE DISCLOSURE

A gimbal support for a magnetic head is constructed with first and second flat circular springs, the first spring being mounted at a first point to the head and at a second point to the second spring, while the second spring is attached at a further point to a fixed mounting block.

Figure 1:
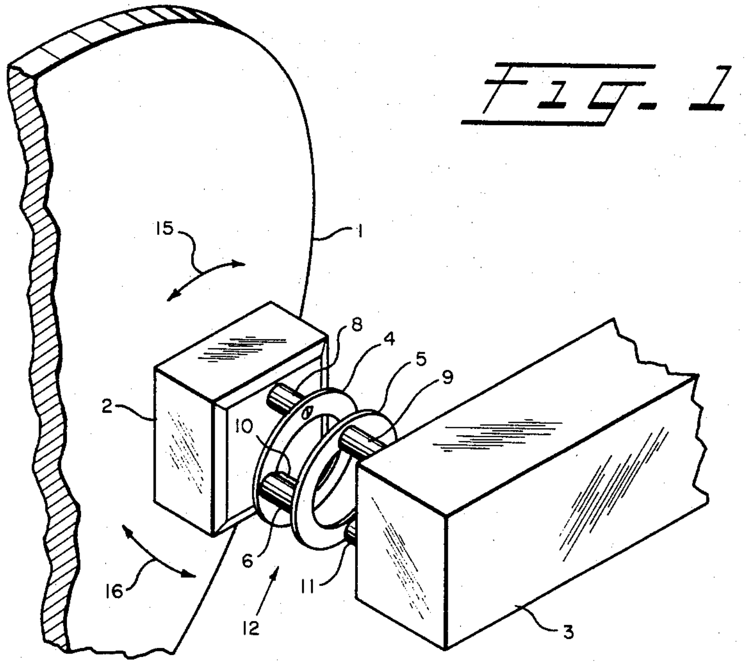

This invention pertains to magnetic recording and reproducing apparatus and is particularly concerned with apparatus for mounting a magnetic transducer head adjacent to a magnetizable recording surface for magnetic co-action therewith.

In the present state of the magnetic recording art, the use of floating magnetic transducer heads is well-known. The term "floating" refers to the action of a transducer head which is resiliently supported in a manner to co-act with the magnetizable recording surface of a suitable drum or disc. When such a drum or disc is rapidly rotated, there is created a laminar flow of the layer of air or gas fluid closely adjacent to the surface. If a transducer head is resiliently supported in close proximity to the magnetizable recording surface of the device, then the rapidly moving layer of fluid causes the transducer head to float at a predetermined distance from the recording surface.

Either a single transducer head or a plurality of such heads may be used, each head co-acting with a separate magnetic track on the recording surface. The heads may be encased in a bearing pad in order to cause them to float. In order to function properly, such floating recording heads must be mounted on a device which allows universal movement but restricts rotation. If the magnetic head is allowed to rotate with respect to the record drum, then the head gap will not be properly aligned with the track with which it is co-acting; this will result in the recording of improperly aligned signals and in the reproduction of signals having incorrect amplitude or phase. Movement of the transducer head other than rotational is necessary, however, in order that the distance of the shoe portion of the head from the recording surface be kept as uniform as possible, i.e., that it follow closely all irregularities of the recording surface.

A primary object of the invention is to provide a mounting for a magnetic transducer head co-acting with a magnetizable recording surface which will substantially prevent rotational movement of the head and will allow other movements thereof.

Among other objects of the invention are the following:

To provide a mounting for a magnetic transducer head which is relatively simple in construction and will allow proper recording and reproduction of signals;

To provide a mounting for a floating magnetic transducer head which will prevent rotational movement of the head and allow all other movements necessary for proper operation;

To provide a gimbal assembly for supporting a floating magnetic transducer head which is relatively simple and economical to construct and will allow the recording and reproduction of accurately aligned signals.

Briefly, in accordance with the invention, a gimbal mounting is provided which comprises two flat springs which are held apart by two standoffs which are rigidly attached to the springs. The springs are preferably round and the standoffs are short relative to the diameter of the springs. One spring is attached to the rear of the magnetic head casing or floating pad and the other spring is attached to a holding block. The place on the springs to which the standoffs are attached is different from that to which the attachments are made to the floating heads and the holding block.

Figure 2:
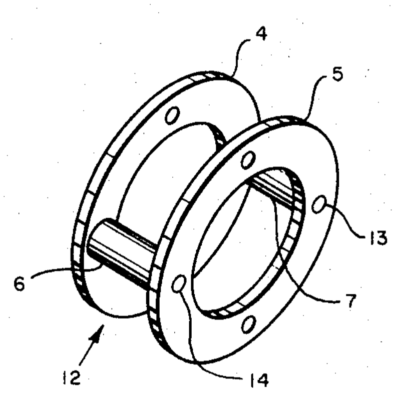

The above and further objects and advantages of the invention will become apparent from the following description thereof, taken in conjunction with the accompanying drawings which illustrate an advantageous embodiment of the invention and its application to a magnetic data storage device of the magnetic disc type. In the accompanying drawings:

FIG. 1 is an isometric view of an embodiment of a gimbal assembly according to the invention shown in position as supporting a magnetic transducing head; and FIG. 2 is an isometric view of the gimbal assembly per se.

Referring now to FIG. 1, reference numeral 1 denotes a magnetic disc having a magnetizable recording surface thereon. Magnetic disc 1 is adapted to be rotated rapidly by a motor (not shown) and to have recorded on its recording surface concentric magnetic tracks. One recording head or a plurality of recording heads are positioned in the bearing pad 2. By making suitable electrical connections to the recording heads, data may be recorded on the surface of the disc or may be read out therefrom. The electrical connections to the heads are not shown since they form no part of this invention; they may be made in any well-known convenient manner. As stated above, when disc 1 is rapidly rotated, it will tend to create a laminar flow of the layer of air or gas fluid closely adjacent to the surface.

The resilient support for bearing pad 2 is constituted, according to the invention, by the gimbal assembly designated generally by reference numeral 12. As shown, the gimbal assembly comprises two washer type springs 4 and 5 which are preferably round and flat; the springs may be advantageously composed of beryllium copper or any other suitable material. The springs are spaced apart by two standoffs 6 and 7 which are spaced apart as shown and are short relative to the diameter of the springs. Standoffs 6 and 7 are preferably positioned to be substantially diametrically opposite each other, but this position is not critical. Standoffs 6 and 7 may be joined to springs 4 and 5 by a suitable soldering or brazing process or with the use of a suitable epoxy adhesive. Alternatively, provision may be made of openings 13 and 14 in spring 5 and corresponding openings in spring 4, with the standoffs 6 and 7 being suitably bolted into place in these openings.

The mounting to bearing pad 2 is achieved by two mounting members 8 and 10 attached to spring 4 and to the bearing pad. Members 8 and 10 are preferably placed midway between standoffs 6 and 7 and may be attached to the spring 4 and bearing pad 2 either in the same manner or in a different manner from standoffs 6 and 7, the particular mode of attachment forming no part of this invention. Two further mounting members 9 and 11 are provided for mounting the gimbal assembly to a mounting block 3, the manner of securing these mountings to spring 5 and block 3 again being a matter of choice. Mounting members 9 and 11 are preferably located opposite members 8 and 10 as shown. In practice, the gimbal 12 constituted by springs 4 and 5 and standoffs 6 and 7 may first be built and then mounted to bearing pad 2 after which the complete assembly is mounted on the holding block 3.

It should be noted that, in order to facilitate explanation, gimbal 12 and bearing pad 2 are shown exaggerated in size relative to disc 1.

It can be seen from FIGS. 1 and 2 that the construction of gimbal 12 including the rigidly connected standoffs 6 and 7, when joined as shown to bearing pad 2 and mounting block 3, effectively restricts any rotation of pad 2, and thus of any recording head which may be located in the pad. The gimbal thus assures relative alignment of the heads and corresponding magnetic tracks. Also, due to the provision of the springs 4 and 5 mounted in the manner shown, other movements of the bearing pad 2 are allowed in response to variations in the laminar flow of the fluid between disc 1 and bearing pad 2. Typical of the movements allowed, for example, are those indicated by the curved paths 15 and 16 in FIG. 1. In addition, it can be seen that the provision of the gimbal and its supports permits the bearing pad 2 to be very stably supported in the static position, i.e., when the disc 1 is not rotating.

While the invention has been illustrated for use with a disc, it is equally applicable for use with any rapidly rotating medium having a magnetic recording surface thereon, such as a drum.

It is thus seen that I have devised a mounting structure for magnetic transducer heads which is simple and economical to construct while effectively acting in operation to restrict undesirable motions of the transducer head and to allow all other motions in response to changes in operating conditions such as changes in the laminar flow.

While the invention has been described with respect to a specific embodiment, various changes and modifications thereof will be readily apparent to those skilled in the art without departing from the inventive concept, the scope of which is set forth in the appended claims.

What I claim is:

1. Apparatus for supporting at least one magnetic transducer head away from a moving magnetic surface comprising: a gimbal assembly including at least first and second spring means, each formed of a single closed loop of resilient material, said spring means being spaced apart and joined by joining means rigidly joining both of said spring means at a first point on each of said loops, at least one magnetic transducing head, a first mounting member rigidly attached to a second point on the first spring means and joining said first spring means to said transducing head, a stationary mounting block, and a second mounting member rigidly attached to a second point on the second spring means and joining said second spring means to said mounting block.

2. Apparatus for supporting at least one magnetic transducer head away from a moving magnetic surface comprising: a gimbal assembly including at least first and second substantially flat and circular resilient spring means, said spring means being co-axial and spaced apart and joined by a plurality of joining means each of which is rigidly attached to both of said spring means, at least one magnetic transducing head, a plurality of first mounting members each being rigidly attached to the first spring means and said transducing head, a stationary mounting block, and a plurality of second mounting members each being rigidly attached to the second spring means and said mounting block.

3. Apparatus for supporting at least one magnetic transducer head adjacent to a moving magnetic surface, comprising: a gimbal assembly including at least first and second substantially circular, flat spring means, said spring means being co-axial and spaced apart and joined by a plurality of joining means each of which is rigidly attached to both of said spring means, each pair of joining means being attached to the spring means at portions thereof substantially diametrically opposite each other, at least one magnetic transducing head, a plurality of first mounting members each being rigidly attached to the first spring means and said transducing head, a stationary mounting block, and a plurality of second mounting members each being rigidly attached to the second spring means and said mounting block, said first and second mounting members being attached to the respective spring means at portions thereof other than the portions to which said joining means are attached.

References Cited

UNITED STATES PATENTS

| | | | |
|---|---|---|---|
| 3,187,112 | 6/1965 | Smith | 340—174.1 |
| 3,124,660 | 3/1964 | Criner | 340—174.1 |
| 3,041,612 | 6/1962 | Woodcock | 340—174.1 |

BERNARD KONICK, *Primary Examiner.*

A. I. NEUSTADT, *Assistant Examiner.*